United States Patent [19]

Lander

[11] 4,067,893
[45] Jan. 10, 1978

[54] AQUEOUS UREA METAL COMPLEX COMPOSITION

[75] Inventor: Harry L. Lander, Trenton, N.J.

[73] Assignee: Poly-Chem Industries, Inc., Saddle Brook, N.J.

[21] Appl. No.: 558,918

[22] Filed: Mar. 17, 1975

Related U.S. Application Data

[60] Continuation of Ser. No. 422,857, Dec. 7, 1973, abandoned, which is a division of Ser. No. 169,092, Aug. 4, 1971, Pat. No. 3,787,368, which is a continuation-in-part of Ser. No. 100,805, Dec. 22, 1970, abandoned, which is a continuation-in-part of Ser. No. 9,076, Feb. 7, 1970, abandoned.

[51] Int. Cl.$^2$ .......................... C07F 7/28; C07F 7/00; C08L 61/24
[52] U.S. Cl. .......................... 260/429.3; 260/29.2 M; 260/29.2 N; 260/29.4 R; 260/77.5 C; 260/429 R; 260/429.5
[58] Field of Search ............... 260/2 M, 2 T, 29.2 M, 260/29.2 N, 67.6 R, 68, 69 R, 71, 72 R, 429.5, 429.3, 77.5 C; 106/57

[56] References Cited

U.S. PATENT DOCUMENTS

| | | | |
|---|---|---|---|
| 2,502,411 | 4/1950 | Neher | 260/86.1 |
| 2,740,736 | 4/1956 | Elmer et al. | 260/67.6 R X |
| 2,847,396 | 8/1958 | Sellet | 260/70 |
| 3,073,723 | 1/1963 | Deal et al. | 260/71 X |
| 3,359,226 | 12/1967 | Giddings et al. | 260/30.4 R |
| 3,370,026 | 2/1968 | Patella et al. | 260/69 R X |
| 3,787,368 | 1/1974 | Lander | 260/67.6 R |

FOREIGN PATENT DOCUMENTS

26,113  11/1969  Japan.

OTHER PUBLICATIONS

Chem. Abstracts, vol. 67:82,555e Solvag, (1967).

*Primary Examiner*—Harold D. Anderson
*Assistant Examiner*—W. C. Danison, Jr.
*Attorney, Agent, or Firm*—Fitzpatrick, Cella, Harper & Scinto

[57] ABSTRACT

Polymeric materials are prepared by polymerizing an organic compound containing at least two labile hydrogens in the presence of a zirconium, hafnium or titanium halide. The labile hydrogen atoms are provided by amides, including aminoplasts, carboxylic acids, polyhydroxy compounds or other compounds capable of forming reactive complexes with zirconium, hafnium and titanium halides. Aqueous media can be employed.

2 Claims, No Drawings

AQUEOUS UREA METAL COMPLEX COMPOSITION

This is a continuation, of application Ser. No. 422,857, filed Dec. 7, 1973, now abandoned, which, in turn, is a division of application Ser. No. 169,092, filed Aug. 4, 1971, now U.S. Pat. No. 3,787,368, issued Jan. 22, 1974, which, in turn, is a continuation-in-part of application Ser. No. 100,805, filed Dec. 22, 1970, now abandoned, which, in turn, is a continuation-in-part of application Ser. No. 9,076, filed Feb. 7, 1970, now abandoned.

This invention relates to novel polymeric products and the method for preparing the same.

The present invention provides a broad class of polymeric products prepared with a zirconium, hafnium, or titanium halide. These polymeric products are suitable for use in structural or ornamental devices, laminates, insulating materials, and adhesives. In general, the products are soluble polymers or insoluble, cross-linked or thermosetting polymers. In certain preferred embodiments, products having outstanding structural strength and heat resistance are obtained. It is a particular advantage of the invention that the products can be prepared in aqueous media. The specific gravity of the products can be varied as desired, and microporous structures can be obtained.

Without intending to be bound by any theory, it is nevertheless hypothesized that the polymeric materials provided in accordance with the present invention contain covalently bonded derivatives of the hypothetical orthozirconic acid, $H_4ZrO_4$, orthohafnic acid $H_4HfO_4$, or orthotitanic acid $H_4TiO_4$.

As is well known, zirconium, hafnium and titanium are elements in the periodic table containing two electrons in an otherwise unfilled d-shell (principal quantum number 4 and 5). In addition to the foregoing, zirconium and hafnium are likewise very similar from the standpoint of atomic radii, having values of 1.454A and 1.442A respectively, while titanium, another member of the group IVb metals, has an ionic radius of 1.324A and a coordination number of 4. Zirconium and hafnium exhibit a preference for a higher coordination number of 6 to 8. The increase in atomic size as well as the low number of d-electrons explain the pronounced tendency of the metals of group IVb to react as electron acceptors whereby to form covalently bonded groupings with electron donors.

Zirconium, hafnium and titanium react with halides to form compounds wherein the metal atom has a valence of four, e.g., $ZrCl_4$, $HfBr_4$ and $TiCl_4$. Such compounds represent the acid halides of the hypothetical amphoteric compounds, orthozirconic acid, orthohafnic acid and orthotitanic acid. Anhydrides of the latter materials, referred to as zirconia, $ZrO_2$, hafnia, $HfO_2$ and titania, $TiO_2$, respectively, are typically three-dimensional polymeric structures, evidencing again the pronounced tendency of such materials to form covalent bonds with electron donors; correspondingly, such materials display a strong resistance to the formation of ions such as $Zr^{+4}$, $Hf^{+4}$ and $Ti^{+4}$. Electron donor groups capable of covalent bond formation in the manner described above can be unshared electron pairs such as characterizing elements of columns V and VI of the periodic table of elements. Thus, such materials will react with the orthoacids previously mentioned to form amides, alkoxides and thio-derivatives.

The products of the invention are prepared from the polymerization of polymerizable organic compounds containing more than one labile hydrogen atom in the presence of a zirconium, hafnium or titanium halide; the preferred halides being zirconium tetrachloride and zirconium oxychloride. Hafnium tetrachloride, hafnium oxychloride, titanium tetrachloride and titanium oxychloride may also be used, but the noted zirconium chlorides are more readily available and less expensive. The corresponding zirconium, hafnium and titanium bromides and iodides are also suitable for use in embodiments of the invention. The oxychlorides of zirconium and hafnium are conveniently prepared by hydrolysis of the tetrachloride.

The products of the invention are polymeric compositions having novel properties. It is believed that these properties, as well as the ease with which the products can be formed, are at least partly due to the incorporation of zirconium, hafnium or titanium into the polymeric stucture. The products may be considered as being formed from zirconium, hafnium or titanium and a polymerizable organic material containing at least two labile hydrogens, said material being capable of complexing, i.e., bonding with the zirconium, hafnium or tatanium halide. Since the initial reaction results in the release of a hydrogen halide such as hydrogen chloride, for example, the result suggests that the reaction mechanism involves the replacement of the labile hydrogen with the metal of the metal halide to form a reactive metal complex. The metal complex then reacts further with the polymerizable compound or an added monomer to form the polymerized product. Typical labile hydrogen-containing groups include, without necessary limitation,

wherein X is O or S, etc., wherein R is lower alkyl, aryl such as phenyl or hydrogen. Thus, representative polymerizable organic compounds suitable for use herein include, without necessary limitation, aldehydes, amides, glycols, amines, aminoalcohols, etc. capable of polymerization in the manner to be described in detail hereinafter. The labile hydrogen atoms are hydrogen atoms which are cleavable in connection with the formation of zirconium, hafnium or titanium metal complexes. The polymerizable organic compound is initially provided in low molecular weight form, e.g. monomeric form.

Three methods or mechanisms of polymer formation which are recognized in the art can be categorized as follows:

I Condensation polymerization characterized by the elimination of a small, usually volatile molecule;

II Addition polymerization of homonuclear π-electron systems; and

III Addition polymerization of heteronuclear π-electron systems with donor molecules.

The aforementioned polymerization methods are, capable of providing polymers of various types, e.g., linear (thermoplastic), two-dimensional sheets or three-dimensional, thermosetting compositions including graft and block polymers and copolymers, depending, for example, upon the functionality of the reactants, i.e., the number and type of functional or "reactive" groups. Such techniques can be implemented in a variety of ways, e.g., simultaneously or sequentially, whereby to produce diverse types of highly useful compositions. Each of the aforedescribed polymer-forming systems, as well as hybrids thereof, can be employed to advantage in the practice of the present invention. This will be made clear by the following discussion, wherein each of such systems will be discussed separately.

I Condensation Polymerization

Condensation polymerization is an illustrative aspect of the present invention and will be discussed first in some detail. Other polymerization techniques falling within the scope of the invention will be more readily understood by those skilled in the art in light of this discussion.

There are basically two types of condensation polymerization reactions. The first type, or complex condensation, involves the reaction of two dissimilar polyfunctional molecules with the group IVb metal halide. Typical of this reaction mechanism would be the polymerforming reaction between for example, a group IVb metal halide and a monomer mixture comprising an aldehyde with a reactive compound such as an amide, a polyhydroxy compound or other compounds of the general formula:

wherein R is alkylene such as methylene, ethylene, propylene and butylene, aromatic such as phenylene,

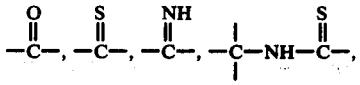

heteroaromatic such as s-trizaine, etc. and X and Y are independently selected from such labile hydrogen-containing groups as

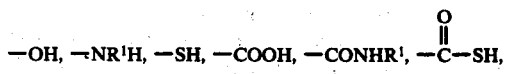

etc. wherein R¹ is lower alkyl, aryl or hydrogen.

Amide/aldehyde condensations are representative of the complex condensations of the invention and will be used for purposes of illustration.

The term "amide" is used in a broad, generic sense and includes not only conventional amides such as formamide, acetamide, propionamide, butyramide, etc., but also diamides such as adipamide, succinamide, maleamide, etc., and aminoplasts such as urea, biuret, ethylene urea, propylene urea, melamine, guanidine, etc. It also includes the thio analogs of such compounds. The preferred monomers are aliphatic amides and water-soluble aminoplasts, and the most preferred are urea, biuret and mixtures thereof.

Useful aldehydes include aliphatic aldehydes such as formaldehyde, acetaldehyde, propionaldehyde, adipaldehyde, acrolein, etc., alicyclic aldehydes such as cyclohexanaldehyde and heterocyclic aldehydes such as furfural, nicotinaldehyde, etc. The preferred aldehydes are the lower aliphatic aldehydes - formaldehyde, acetaldehyde and propionaldehyde and furfural, with formaldehyde being most preferred.

In addition to the amide and aldehyde, there may be present one or more polyhydroxy compounds. The most suitable polyhydroxy compounds are (i) organic polymers bearing pendant hydroxyl groups such as polyvinyl alcohol; cellulose and derivatives thereof, including carboxymethylcellulose, hydroxyethyl cellulose; starches and modified derivatives thereof; etc., and (ii) polyhydroxy-benzenes, such as catechol, resorcinol, hydroquinone and pyrogallol. Polyhydroxy compounds are beneficial in improving the physical properties of the products and in minimizing shrinkage. The polyhydroxybenzenes can be used in amounts of about 0.01 to 1 mole per mole of amide, the preferred level being of the order of at least about 0.05 mole per mole of amide.

The amide/aldehyde reaction products, with or without added polyhydroxy compound, can be prepared by a number of different techniques, it being desirable that a substantially homogeneous reaction mixture is formed containing all of the desired reactants. Since the reaction is often rapid and exothermic, it is advisable to reserve one of the reactants, typically the aldehyde, and to prepare a blend of the remaining components. The reaction is then completed by rapidly mixing in the reserved component. The complete reaction mixture then rapidly polymerizes to a high molecular weight product.

The reaction is most conveniently carried out in the presence of water, although polymerization can also be conducted under essentially anhydrous conditions. The precise amount of water may vary within fairly broad limits. In practice, considerable quantities of water will generally be used, since the water facilitates blending of the reactants and also helps control the exotherm of the final reaction. The amount of water will typically be of the order of about 3 moles per mole of amide, and may be as high as 10 moles or as low as 0.3 moles. Any excess water will eventually be lost from the product by evaporation. The amount of water added will also effect the porosity of the final product and its specific gravity, greater amounts giving a more porous structure with larger, more numerous voids and lesser amounts giving a denser, less porous product.

The aldehyde will preferably be employed in amount sufficient to react with substantially all of the amide present as well as at least a portion of the polyhydroxy compound, if used. However, considerably lesser or greater proportions can be used, if desired. The best physical properties are obtained when the aldehyde is present in the proportion of at least about one mole per mole of amide, with an additional one mole of aldehyde per mole of polyhydroxy compound, if any. An excess of the order of 10% of aldehyde is preferably provided to compensate for loss through volatilization. Larger excesses, even of the order of several hundred percent, can be used, since any unreacted aldehyde is lost by evaporation. The preferred aldehyde, is most conveniently added in the form of the commercially available 37% aqueous solution.

The zirconium, hafnium or titanium halide is generally employed in a proportion of between about 0.01 mole and 0.5 mole per mole of amide, and preferably between about 0.03 and 0.3 mole per mole of amide. In general, higher levels of the metal halide improve the gloss, luster and general appearance of the product, reduce cracking and reduce the rate of reaction. At very low metal levels, the products have a dull, opaque and somewhat chalky appearance. At higher levels, they become more glossy and smooth. At still higher levels, they are quite glossy and become translucent to transparent.

It has also been found advantageous to physical characteristics of the product to incorporate an organic, water-miscible solvent as part of the reaction mixture. Such solvents include N, N-dimethyl formamide, dioxane, lower alcohols, dimethyl sulfoxide, acetone, tetrahydrofuran, ethylene glycol, polyethylene glycol, lower alkyl ethers of ethylene glycol or diethylene glycol, etc. The solvent may contain reactive groups which are incorporated into the polymer product. Particularly advantageous solvents are aprotic solvents such as N, N-dimethyl formamide. The use of such solvents is especially desirable when water is not present or is present only in small quantities.

Where the amide employed has a relatively low melting point, say below about 150° C., the following procedure has been found particularly useful. The zirconium, hafnium or titanium halide, in the form of the anhydrous tetrachloride, for example, is admixed with the amide and the resulting mixture is gently warmed until a uniform molten mass is obtained. In the case of zirconium and hafnium, the mixture will generally exhibit a somewhat depressed melting point. In the case of titanium tetrachloride the liquid halide and amide are mixed and the mixture is warmed until a clear solution is obtained. A portion of the water is then slowly added with stirring, and the resulting mixture is stirred at about 85° to 100° C until substantially complete solution occurs. In order to obtain better heat transfer throughout the melt, inert, insoluble, insoluble, solid particles such as glass beads can be added to the powder prior to melting. The addition of the inert solid particles results in better mixing of the reactants and a more homogeneous reaction mixture. In addition, the inert particles act as heat reservoirs which help prevent undesired fluctuations in temperature or local overheating. In some cases, the inert particles may be retained in the mixture when it is polymerized to serve as a filler or the like. Alternatively, the particles may be removed if desired by straining or decanting the fluid mixture. The resulting composition which is generally pale yellow and somewhat viscous, can be used immediately if desired. Where the amide used does not form a molten mixture with the metal halide at a sufficiently low temperature, the metal halide and amide can be initially mixed together in the presence of the water. In this instance, the metal halide can be added in the form of the oxychloride, or in the case of zirconium and hafnium halides the oxychloride can be generated in situ by the reaction of the tetrachloride and water.

It is known from the earlier work done by E. A. Werner ("The Chemistry of Urea", Emile A. Werner, Longmans, Green & Co., of London, 1923) that urea decomposes upon heating to cyanic acid and ammonia. Where the decomposition takes place in the presence of acid, the ammonium salt of the mineral acid is obtained. When urea is heated at or above its melting point subsequent reaction products are formed as a result of the instability and reactivity of cyanic acid. For example, cyanuric acid is produced by polymerization of cyanic acid while biuret arises from the interaction of cyanic acid and unchanged urea at temperatures ranging from about 135° C to about 190° C. Biuret however will also form during the hydrolysis of cyanic acid in aqueous solutions even at low temperatures. Werner found that when urea is heated at a moderate rate to a temperature of about 180° C for about 7-8 minutes the resulting mixture has the following composition:

| | |
|---|---|
| $NH_4OCN$ (in sublimate) | 0.21% |
| Biuret | 24.50 |
| Cyanuric Acid | 5.93 |
| Ammelide | 3.94 |
| Loss ($NH_3$ + HCNO) | 12.20 |
| | 46.78% |
| Unchanged urea (by difference) | 53.22 |

A considerable amount of biuret, therefore is present in pyrolyzed urea. Continued pyrolysis of urea for longer periods results in a decrease in the concentration of biuret accompanied by the loss of ammonia due to the conversion of biuret to cyanuric acid and the stable compound ammelide. It is known from the work of F. L. Scott and H. O. Smith (The Reaction of Urea with some amino -1,3,5-triazines, Technical Report No. 17, Office Naval Research, 1960) that copyrolysis of urea or biuret with melamine and ammeline leads to the formation of 2-amino-4,6-diureido-1,3,5-triazine and 2-hydroxy-4,6-diureido-1,3,5-triazine respectively. All of these nitrogen containing compounds, therefore, that is urea, cyanic acid, cyanuric acid, biuret and ammelide, can be essentially in a state of equilibrium in hot molten urea, the concentration of each compound in the mixture depending upon the temperature to which the urea is heated. In the practice of this invention, urea can be made to undergo similar reactions to provide a mixture of nitrogen containing compounds, the composition of which depends upon the temperature to which the mixture is heated. For convenience, such mixtures are herein referred to as "pyrolyzed urea", although it will be understood that other components of the equilibrium mixture, e.g. biuret, can also be employed as the initial compound. This mixture can further react or complex with the metal halide to give a metal complex composition which approximates the urea equilibrium mixture for the particular temperature range employed.

These pyrolyzed urea mixtures can, if desired, be preformed prior to the addition of the metal halide. Alternatively, they may be conveniently formed in the presence of the metal halide by simply melting together the urea and the metal halide, heating the molten mass to the desired temperature and holding it at that temperature for a sufficient time to achieve equilibrium. As a third alternative, the urea pyrolysis mixture may be formed and added to the polymerization mixture at some subsequent point, e.g. together with the aldehyde. Finally, any combination of the above techniques can be practised, as exemplified hereinafter.

In any of these techniques involving pyrolyzed urea, the properties of the final polymer can be varied in a predetermined manner by changing the temperature to which the initial urea mixture is heated in order to obtain the desired equilibrium mixture. For example, it has been found that a high proportion of biuret contributes to higher physical strength and hardness, better gloss, lower shrinkage and improved clarity in the final polymer. A similar desired balance of properties can be achieved either by pre-mixing ures and biuret in the proper proportions, or by starting with urea alone or biuret alone and heating it to the temperature at which the corresponding equilibrium mixture exists.

A preferred method for forming the amide/aldehyde products of the invention is to form a mixture of the water, amide, zirconium, hafnium or titanium halide, and to add the aldehyde thereto. Any solvent and polyhydroxy compound present can be admixed with either the aldehyde or the amide. Any polyhydroxybenzene or water-miscible solvent employed can be added to the amide-metal halide melt prior to, simultaneously with, or subsequent to the water. Other variations in the mixing steps are also possible, so long as a reasonable homogeneous mixture is obtained prior to the final reaction.

It has been found advantageous in the practice of a certain embodiment of the invention to reserve a portion of the amide and to add it subsequent to the formation of the amide-metal halide melt. Most conveniently, this reserved portion of the amide will be added simultaneously with the aldehyde. The amide can be any of the previously discussed materials, including the mixtures prepared by pyrolysis of urea, biuret, etc.

When an amide, typically urea, or a urea pyrolysis mixture is mixed with an aqueous solution of aldehyde, typically formaldehyde, the mixture may undergo undesirable changes with the passage of time. Low or high molecular weight condensation products may form and a heavy precipitate may deposit. It has been found that these amide-aldehyde compositions can be stabilized by the addition of small quantities of cyanuric acid, of the order of about 3% to about 25% based on the molar concentration of formaldehyde present. Analogs of cyanuric acid, such as ammeline and ammelide, can similarly be employed. Where relatively low amounts of cyanuric acid are used, the resulting solutions are generally clear; higher levels may result in some haziness or opacity, but any solids which deposit are readily redispersed. The addition of cyanuric acid to the polymer mixture also confers an additional improvement in the hardness and casting properties of the final product, and this occurs whether or not a portion of the amide is reserved and added with the formaldehyde. In any case, the cyanuric acid may be separately added as such or may be formed by pyrolysis of the amide used.

It has been found that a smoother, more controllable polymerization and improved physical properties are realized if the acidity of the polymerization mixture is substantially reduced prior to completing the polymerization. Although it is not intended to be bound by an particular theory, it appears that polymerization can occur by two distinct routes - the novel group IVb metal-induced mechanism and the known acid-catalyzed condensation mechanism. Removal of hydrogen ion would be expected to suppress the latter, and observations indicate that this is the case, since the exotherm is reduced dramatically and the product obtained has a harder, more glassy appearance, with improved hardness, gloss and clarity.

The acidity of the polymerization mixture can be appreciably reduced in a number of ways. For convenience, each of these techniques is generally practised upon the solution formed by the addition of water or other solvent to the molten amide-metal halide mixture. This solution is hereinafter referred to as the "hydrolyzed amide-metal halide reaction product". For example, some of the hydrogen halide may be removed by allowing the hydrolyzed amide-metal halide reaction product to stand or age at room or elevated temperatures for from several hours to several days.

The hydrogen ion concentration can be reduced by the addition of an inorganic alkaline earth metal base such as calcium hydroxide, calcium oxide, magnesium hydroxide or magnesium oxide or basic salts such as, for example, sodium acetate, sodium tetraborate and sodium bicarbonate to the hydrolyzed amide-metal halide reaction product. Organic bases such as ethanol-amine and melamine can also be employed to reduce the hydrogen ion concentration. Generally, where sufficient base or basic salt is added to neutralize approximately half of the hydrogen halide present in the hydrolysis mixture products having improved strength and resistance to aging are formed. The neutralization reaction is generally carried out at room temperature, although higher temperatures may be employed.

The hydrogen ion concentration can also be reduced through the use of any of the known ion exchange methods.

The preferred method of reducing the hydrogen ion concentration, however, consists of introducing an oxidizing agent into the hydrolyzed amide-metal halide reaction product. Any oxidizing agent which is capable of oxidizing the halide ion to the free halogen in the presence of the group IVb metal halide may be employed. Oxidizing agents such as hydrogen peroxide, oxygen, ozone, air, sodium perborate and potassium peroxide are among the oxidizing agents which can be employed. The oxidation reaction may be represented as follows, wherein the hydrogen halide is hydrogen chloride and the oxidizing agent is hydrogen peroxide:

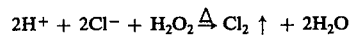

The oxidation reaction is preferably carried out at elevated temperatures. For example, where water is the solvent, the oxidation is preferably carried out at a temperature at or near the boiling point of the mixture. The use of agents such as sodium perborate in the oxidation step has the additional advantage of neutralizing some of the hydrogen halide to its corresponding metal salt. Hydrogen peroxide, oxygen, ozone and air are the preferred oxidizing agents since the use of such agents does not introduce foreign matter into the polymerization mixture which may discolor or affect the physical properties of the polymerized product. Where the oxidizing agent is air, oxidation of the halide ion can be carried out by allowing the hydrolyzed amide-metal halide reaction mixture to stand or age in contact with air. Although some of the halide ion escapes as hydrogen chloride during the aging process, aging also results in some air oxidation of the halide ion to the free halogen. The overall reaction may be represented as follows:

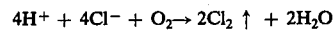

The rate of air oxidation or aging can be accelerated by bubbling air through the reaction mixture, preferably at elevated temperatures.

The rate of the oxidation reaction is dependent on the concentration of the metal complex and the oxidation does not proceed at a reasonable rate in the absence of the metal complex. Generally sufficient oxidizing agent is added to reduce considerably the concentration of hydrogen ion, as determined by standard acid-base titration techniques. It has been found most convenient to express the acid concentration of the mixtures as a function of the amount of zirconium, hafnium or titanium present, since various adjuvants and diluents which can be present would alter the absolute concentration. The standard unit of measurement which has been adopted for this purpose is the ratio of equivalents of titratable acid to moles of metal present in the sample. The number of equivalents of titratable acid is determined by titrating an aliquot of the mixture with standard base, such as sodium hydroxide, to pH 8. Since the number of moles of zirconium, hafnium or titanium present in the sample is known from the amounts of materials initially employed, the acid/metal ratio is determined by simple calculation.

Any significant reduction in this acid ratio will produce measurable improvement in the strength, integrity and resistance to degradation on aging of the final product. However, the greatest improvements have been found when the acid ratio is reduced to a value of less than 1, preferably between about 0.5 and 0.75. The course of the oxidation can be followed simply by removing samples at various intervals, titrating them, and stopping the reaction at the desired point. Carrying the oxidation past the desired range may lead to solubility problems and difficulties in casting due to variations in viscosity. Since the preferred oxidizing agents, such as hydrogen peroxide, can be lost from a boiling reaction mixture without oxidizing the halide ion, it is best to follow the reaction by titration rather than merely adding a predetermined amount of oxidizing agent.

The oxidation reaction can be carried out over a range of temperatures, but it is preferred to carry it out at the highest convenient temperature, e.g. the boiling point of the mixture at atmospheric pressure, in order to achieve a rapid reaction rate and liberation of the free halogen which is formed.

It has also been found that the addition of concentrated sulfuric acid to the reaction mixture containing the metal complex will result in displacement of some of the dissolved hydrogen halide. In addition to reducing the halide ion concentration, however, the addition of sulfuric acid to the reaction mixture results in a polymer which is harder and glossier than the non-sulfated polymers. The sulfate ion appears to be bound within the polymer structure. Since it is known that zirconium has a strong affinity for sulfate ions and since no free sulfate ions were found in the polymerized product, the mechanism of the reaction probably involves the complexing of the sulfate ions with the polymerized product, resulting in a polymer having novel properties.

The final polymerized product is obtained by mixing together all of the desired reactants, including the solution containing the amide-metal complex, cooled to a temperature between room temperature and about 60° C, the aldehyde, preferably as a solution in water or a watermiscible solvent and any additional water desired, as well as any fillers, dyes, pigments or hydroxyl-containing polymers which are to be included. After a brief induction period polymerization generally takes place rapidly after the solutions are mixed.

Typically, polymerization will occur rapidly after the complete mixture has been formed. The mixture will remain fluid for several seconds, during which time it can be poured into a mold, extruded onto a moving surface or otherwise handled as desired. Within a very short period of time, typically a few minutes or less, the mixture will solidify and exhibit an exotherm. At this point, it can be handled and removed from the mold, although the development of physical properties will continue until the cure is complete and excess water has evaporated, typically, within a few hours. In preferred embodiments of the invention, particularly where polyhydroxybenzene compounds are included, shrinkage is very low and the final product conforms closely to the contour and dimensions of the mold in which it was made.

Products of the invention show markedly different properties such as strength, shock resistance and heat resistance, when compared to urea-formaldehyde castings previously available. They typically possess high heat resistance and low flammability. In addition, they evolve little or no toxic gases when heated to high temperatures. Moreover, the polymerization can be extremely rapid and can be conducted in an aqueous system, if desired. Accordingly, the products of the invention can be employed in areas where previously known materials have been found unsatisfactory.

As described above, where large quantities of water are employed in the reaction mixture a product having a highly porous structure is obtained. These porous materials show a marked ability to absorb large quantities of organic and inorganic liquids such as, for example, acetone, carbon tetrachloride and water. In some instances these highly porous materials will absorb more than twice their own weight of a given liquid. On standing a room temperature the absorbed liquid will evaporate, the rate of evaporation depending upon the volatility of the particular liquid employed and the temperature and relative humidity of the surroundings. The absorption-evaporation process can be repeated indefinitely, thus making it possible to reuse the material after the liquid has evaporated. The ability of the porous materials to reabsorb the liquid after evaporation is an indication that the molecular structure of the porous material does not change during absorption or evaporation.

Aldehyde/polyhydroxybenzene systems are similarly prepared analogously to the amide/aldehyde systems. In this case, the polyhydroxybenzene compound is preferably admixed with water and the group IVb metal halide prior to the addition of the aldehyde. The useful polyhydroxybenzenes and aldehydes are as described above. Resorcinol and catechol form a molten mixture with zirconium tetrachloride at a sufficiently low temperature to permit them to be mixed together in the absence of water. Hydroquinone is more conveniently handled by dissolving it in water to facilitate mixing it with the metal halide.

When the polyhydroxybenzene is resorcinol and the aldehyde is formaldehyde, polymerization occurs immediately upon the addition of the aldehyde with vigorous exotherm. When catechol or hydroquinone is used, there is a longer induction period, and mild heating may be desirable to initiate the reaction. The products obtained are typical, hard, shock-resistant, solid materials.

Simple condensation polymerizations are those wherein a single polyfunctional compound is condensed with the group IVb metal halide. Compounds of the formula

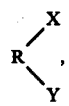

as previously defined, are included among the compounds capable of undergoing simple condensation. Typical of such compounds are di- and trihydroxy compounds, dicarboxylic acids, diamides, lactams, etc.

Thus, polymer formation can result from the reaction of, for example, 2 moles of hexamethylene glycol with one mole of ZrCl$_4$ by the splitting off of HCl to produce a polymeric structure, such as:

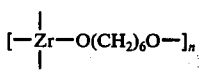

The reaction of resorcinol with Hf$_j$Br$_4$ to form the following type of polymeric structure would likewise be typical:

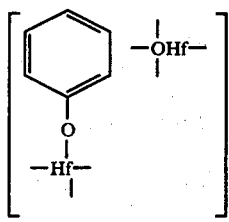

Further typical of the simple condensation polymerization mechanism is the product obtained by the interaction of a zirconium or titanium halide with urea, such product conforming to structures such as:

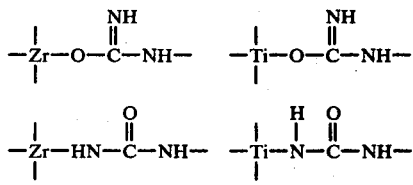

These simple condensation products are, in addition to being useful per se as polymeric materials, also useful as prepolymers or "building blocks" in complex condensation polymerizations.

II Addition Polymerization of Homonuclear Systems

This particular system is analogous to those previously described and can be illustrated with reference to the reaction product of acrylamide with zirconium tetrahalide. This material, when subjected for example to peroxide initiated polymerization in the presence of one or more additional olefinic monomers copolymerizable therewith will yield three-dimensional polymeric products containing covalently-bonded zirconium. A similar result obtains with the reaction product of a zirconium halide with an ethylenically unsaturated carboxylic acid, such as acrylic acid.

The addition polymerization systems are handled in a manner analogous to that described for the amide/aldehyde condensation systems. Thus an ethylenically unsaturated amide such as acrylamide, methacrylamide, 1-butene amide, etc. can be admixed with the group IVb metal halide, following the procedure previously described. The substantially homogeneous solution formed from the unsaturated amide, the metal halide and water is treated with a small amount- say 0.05 to 0.5 percent by weight, based on the weight of the amide - of a free radical initiator and the mixture is maintained at a temperature at which the initiator is active. Suitable free radical initiators include any of those employed in addition polymerizations, such as the alkali metal persulfates, t-butyl peroxide, benzoyl peroxide, t-butyl procrotonate and azo bis (isobutryronitrile). If desired, the initiation temperature may be reduced by adding a suitable reducing agent such as sodium metabisulfite. The polymers obtained are typically very high molecular weight, transparent, water-insoluble yellow solids. The polymer properties can be modified by the addition of an aldehyde, polyhydroxy compounds and fillers, as described above. Additionally, ethylenically unsaturated amide monomer can be admixed with other polymerizable monomers prior to the addition of the free radical initiator to produce novel copolymers. The properties obtained by polymerizing these monomers are quite different from those resulting from after-treatment of a preformed polymer.

Addition polymerization of ethylenically unsaturated carboxylic acid systems is handled in the same manner as the ethylenically unsaturated amide systems already described. Suitable acids include acrylic acid, methacrylic acid, ethacrylic acid, 1-butenoic acid, etc. The polymers obtained are typically hard, yellow, transparent solids which exhibit some swelling when immersed in water, but do not dissolve.

A specific and unique form of carboxylic acid systems is the embodiment wherein a salt of a multivalent metal is incorporated for the purpose of occupying at least some of and preferably substantially all of the carboxylic acid groups which are not occupied by zirconium, hafnium or titanium. The term "multivalent metal" refers to a metal having a valence greater than 1. Suitable metals include calcium, magnesium, nickel, cobalt, zinc, aluminum, iron, copper, etc. These can be used in the form of any salt which renders the metal ion available to the carboxylic acid, such as oxides, hydroxides, carbonates, bicarbonates, nitrates, sulfates, chlorides, etc. The resulting polymers are exceptionally hard and strong and are suitable for use in structural devices. Where both carbonate or bicarbonate anion and a multivalent metal ion are provided, either from separate salts or as the multivalent metal carbonate or bicarbonate, the polymerization is accompanied by foaming to provide a low density, porous, hard material with high structural strength and shock resistance. Commercially available grouting and mortar cements which contain calcium sulfate and carbonates are suitable for use in this embodiment. The products are particularly suited for use as structural materials.

III Addition Polymerization of Heteronuclear Systems

These systems can be illustrated with reference to the reaction product of ethylene glycol with zirconium tetrachloride. Reaction of the latter compound with a diisocyanate can result in formation of a three-dimensional zirconium-containing polyurethane. By way of contrast, a linear polyamide can result from the reaction of tetrakis (p-aminocatecholyl) zirconate derived from zirconium tetrachloride and p-aminocatechol with, for example, a diketene.

In addition to the foregoing, the invention includes hybrid systems wherein two or more of the above types of polymerization are carried out. For example, it is possible to react an amide, zirconium tetrachloride, an ethylenically unsaturated acid and a free radical initiator, with or without the addition of aldehyde, thereby obtaining a product wherein both addition and condensation polymerization has occurred.

The following representative examples illustrate practice of specific embodiments of the invention.

EXAMPLE 1

In each of the following preparations, the same procedure is followed. A quantity of 9.0 gm. of urea is mixed with the noted amount of the noted metal chloride and the dry mixture is gently heated until melting occurs the temperature being maintained below 100° C. Then 3.0 ml. of distilled water is added with stirring and the mixture is heated below the boiling point and stirred for several minutes until a relatively uniform solution is obtained. This solution is cooled to room temperature, 16 ml. of 37% formaldehyde solution (0.2 moles $CH_2O$) is added. The resulting solution is thoroughly blended and quickly poured into the bottom half of a petri dish having a diameter of about 3 inches and a depth of about 0.5 inch.

The reactant compositions are as follows.

| Example | Metal Chloride - Amount |
|---|---|
| 1A | $ZrCl_4$ - 0.6 gm. (0.0026 mole) |
| 1B | $ZrCl_4$ - 1.2 gm. (0.0052 mole) |
| 1C | $ZrCl_4$ - 2.4 gm. (0.01 mole) |
| 1D | $AlCl_3.6H_2O$ - 2.41 gm. (0.01 mole) |
| 1E | $Al(NO_3)_3.9H_2)$ - 3.75 gm. (0.01 mole) |

Examples 1A, 1B and 1C, representing practice of the present invention, polymerize rapidly with a marked exotherm to give strong, solid, polymerized products within a period of a few minutes. Luster and hardness increase with increasing zirconium content, with Example 1C giving a glossy, lustrous plate with exceptional resistance to fracture.

Examples 1D and 1E, which represent typical Lewis acid-catalyzed polymerizations, polymerize more slowly than any of Examples 1A, 1B and 1C. The products formed have a dry, chalky surface and are relatively brittle and fragile.

Example 1A is repeated, using molar equivalent amounts of magnesium chloride hexahydrate and zinc chloride in place of the zirconium tetrachloride. The magnesium chloride system is still liquid after 20 hours. The zinc chloride system does not solidify until after one hour and the product formed is dull, chalky, brittle and fragile.

Example 1C is repeated, substituting hafnium tetrachloride for zirconium tetrachloride. The results obtained are quite similar to those of Example 1C except that the product is somewhat less lustrous than that of Example 1C and has a few surface wrinkles.

EXAMPLE 2

Following the procedure described in Example 1, the following systems are prepared:

| Examples | Components |
|---|---|
| 2A | 25 gm. melamine, 2.5 gm. zirconium tetrachloride, 7.5 ml. water, 24 ml. formaldehyde (37%) |
| 2B | 17 gm. acetamide, 4 gm. zirconium tetrachloride, 4 ml. water, 30 ml. formaldehyde (37%) |

Example 2A produces a hard, milk white opaque polymer. Example 2B produces a yellow, transparent polymer.

EXAMPLE 3

A quantity of 6.0 gm. of urea is admixed with 2.0 gm. zirconium tetrachloride and the resulting dry mixture is gently warmed until molten, after which 4.0 ml. of water is added and the mixture is stirred and warmed until dissolved. In a separate vessel, 5.0 gm. of high molecular weight, fully hydrolyzed polyvinyl alcohol is slurried in 20 ml. of 37% formaldehyde and the slurry is poured into the urea-containing solution. The mixture is quickly stirred and poured into a petri dish base. After a very brief induction period, a strong exotherm is observed and the mixture polymerizes rapidly to a white, translucent solid plate. The fully-cured product is hard and highly resistant to breakage.

EXAMPLE 4

Following the procedure of Example 3, the following are prepared:

| Example | Components |
|---|---|
| 4A | 1.4 gm. thiourea, 0.6 gm. zirconium tetrachloride, 3.0 ml. water, 16.0 ml. formaldehyde, 2 gm. polyvinyl alcohol |
| 4B | As in 4A except that a molar equivalent amount of quanidine hydrochloride replaces the thiourea. |

Example 4A initially produces a gel which passes through a rubbery state and finally to a hard, brittle, translucent solid. Example 4B passes from a gel to a slightly yellow rubbery material with high tensile strength.

EXAMPLE 5

A mixture of 18.0 gm. of urea, 2.5 gm. of resorcinol, 3.0 gm. of zirconium tetrachloride and 8 ml. of water is stirred with heating until a uniform dispersion is obtained. The mixture is then cooled to room temperature and the noted amount of each of the following aldehydes is added:

| Example | Aldehyde - Amount | |
|---|---|---|
| 5A | formaldehyde - 35 ml. | (0.43 mole) |
| 5B | acetaldehyde - 19 ml. | (0.43 mole) |
| 5C | propionaldehyde - 25 ml. | (0.43 mole) |
| 5D | furfural - 41 gm. | (0.43 mole) |

Each of the resulting mixtures is thoroughly stirred and poured quickly into a petri dish mold. Example 5A quickly polymerizes with a strong exotherm to give a hard, strong polymer which exhibited little shrinkage. Examples 5B and 5C produce tacky, yellow polymers exhibiting marked adhesive properties. Examples 5D produces a very strong exotherm and yields a hard, black polymer with high shock resistance.

EXAMPLE 6

A mixture of 90.0 gm. of urea, 16.5 gm. of resorcinol and 23.0 gm. of zirconium tetrachloride is gently warmed until a uniform molten mass is obtained. A mixture of 10 ml. of water and 25 ml. of N,N-dimethyl formamide is added and stirred until a uniform dispersion is obtained. The mixture is cooled to room temperature and 175 ml. of 37% formaldehyde is added and rapidly mixed in. When poured into a mold, the mixture polymerizes smoothly and quickly to give a hard, strong polymer with little shrinkage.

EXAMPLE 7

A mixture of 16.5 gm. of resorcinol and 1.5 gm. of zirconium tetrachloride is gently warmed until molten, after which 4.0 ml. of water is added and stirred in unitl a uniform dispersion is formed. The dispersion is cooled and 16.0 ml. of 37% formaldehyde is added. A very strong exotherm occurs and a pink-to-red hard polymer is quickly formed.

EXAMPLE 8

A mixture of 7.1 gm. of acrylamide and 3.0 gm. of zirconium tetrachloride is gently warmed until molten. A quantity of 3.0 ml. of water is added. The resulting solution is cooled and 3 drops of t-butyl procrotonate are added. The solution gels almost immediately and rapidly polymerizes with a strong exotherm to a tenacious, yellow polymer.

EXAMPLE 9

A mixture of 7 gm. of acrylic acid and 1 gm. of zirconium tetrachloride is warmed gently until molten and 3 ml. of water is added. The resulting solution is cooled and 3 drops of t-butyl procrotonate are added. The mixture polymerizes rapidly to give a hard, brittle, amber resin which swells but does not dissolve in water.

EXAMPLE 10

To 14 ml. of a 50% aqueous solution of acrylic acid, there is added 2.3 gm. of zirconium tetrachloride, a quantity of 7 gm. of mortar cement containing calcium sulfate and calcium carbonate, and 0.3 gm. of t-butyl procrotonate. The mixture rapidly foams and forms a hard, strong porous structure suitable for use as a structural material.

EXAMPLE 11

A mixture of 6.0 gm. of urea and 2.3 gm. of zirconium tetrachloride is gently heated until molten, and 5 ml. of water is added. The resulting slightly viscous syrup is cooled to room temperature, 7 ml. of acrylic acid is dissolved therein and a mixture of about 0.2 gm. of ammonium persulfate and 0.1 gm. sodium thiosulfate is added as a free radical initiator. The mixture rapidly polymerizes with foaming to produce a white, porous, flexible material.

EXAMPLE 12

The procedure of Example 11 is repeated with 12 ml. of 37% formaldehyde replacing the 5 ml. of water. A hard, rigid, white, opaque polymeric composition is formed.

EXAMPLE 13

A mixture is prepared from 40 ml. of bis (2-methoxyethyl) ether, 4.6 gm. of zirconium tetrachloride, 15.2 gm. urea and 24 ml. of furfural. The mixture polymerizes to a porous, black, resinous material.

EXAMPLE 14

A mixture is prepared from 24 gm. of urea, 23.3 gm. of zirconium tetrachloride, 22 gm. of resorcinol and 30 ml. of bis (2-methoxyethyl) ether. The mixture polymerizes to a rigid, tacky, yellow-brown material which is insoluble in water and acetone.

EXAMPLE 15

A mixture of 36gm. of urea and 9.6gm. of zirconium tetrachloride is added to a solution of 18ml. of 37% formaldehyde, 18ml. of phenol and 10ml. of water. The resulting mixture is heated at 90° C for at least 30 minutes then cooled to room temperature to give a tan, opaque fluid. A suspension of 12gm. of polyvinyl alcohol (90–98% hydrolyzed polyvinyl acetate) in 78ml. of 37% formaldehyde is added and the resulting mixture polymerizes readily and smoothly to give a hard, lustrous, glossy polymer. By admixing the phenol and a portion of the formaldehyde in the manner indicated, the exotherm normally associated with the use of hydroxybenzenes is controlled.

EXAMPLE 16

15.0gm. of urea is mixed with 14.45gm. of zirconium tetrachloride and the dry mixture is gently heated to about 150° C. Water (25ml.) is added to the molten solution with stirring and the mixture is heated to boiling. A 3% aqueous solution of hydrogen peroxide is added dropwise to the hot solution with stirring. One milliliter aliquots are removed at intervals and titrated with 1N aqueous sodium hydroxide to pH8 in order to determine the hydrogen ion concentration. The addition of peroxide is continued until the titratable acid ratio is 0.75. 48gm. of urea is heated for 20 minutes at 170°–175° C, after which the melt is removed from the heat and placed in a water bath; the melt solidifies. 112ml. of 37% formaldehyde solution (1.4 moles) and cyanuric acid (25.8gm.) are mixed together and the mixture is heated at 50°–60° C with stirring until a clear solution is obtained. The formaldehyde solution is then added to the solidified urea residue and the mixture is heated at about 50° C with stirring until solution occurs. The resulting solution is then poured into the urea-zirconium solution; the mixture is blended and quickly poured into the bottom half of a petri dish. The mixture polymerizes to a white, solid plate. The above reaction can be carried out in the absence of hydrogen peroxide; the polymer thus obtained tends to discolor and is more brittle.

EXAMPLE 17 a. 30.25gm. of biuret is added to 14.45gm. of zirconium tetrachloride. The powders are mixed together and the mixture is heated to about 150° C. The resulting melt is removed from the heat and 30ml. of water is added. The mixture is heated to boiling and 3% hydrogen peroxide solution is added dropwise to the boiling solution with stirring. One milliliter aliquots are removed at intervals and titrated with 1N aqueous sodium hydroxide in order to determine the hydrogen ion concentration. The addition of peroxide is continued until the titratable acid ratio is 0.75. 6gm. of urea is added to the oxidized solution and the mixture is warmed to 40° C.

b. 48gm. of urea is heated to 170° C and the melt is heated at this temperature for 20 minutes. The melt is allowed to cool to hard solid. A mixture of 112ml. of 37% formaldehyde solution and 16.77gm. of cyanuric acid is heated with stirring until a clear solution is obtained. The formaldehyde solution and the urea residue are mixed together and the mixture is heated at about 50° C until complete solution occurs. The resulting mixture and the urea mixture formed in a) above are heated to 60° C and then blended together. The blended reactants are then poured into a mold 155mm. × 15mm. A white, solid polymer is obtained.

EXAMPLE 18 a. 15.0gm. of urea and 14.4gm. of zirconium tetrachloride are mixed together and the mixture is heated to 150° C. The resulting melt is removed from the heat and 30ml. of water is added. The mixture is then heated to boiling and 3% hydrogen peroxide solution is added dropwise to the boiling solution with stirring. One milliliter aliquots are removed at intervals and titrated with 1N aqueous sodium hydroxide to pH of 8. The addition of peroxide is continued until the titratable acid ratio is 0.75. 21gm. of urea is added and the mixture heated at 40° C until a clear solution is obtained. The solution is then cooled to room temperature.

b. Biuret (41gm.) is added to 112ml. of 37% formaldehyde solution with stirring and the mixture is heated to 75°–80° C, after which it is cooled to room temperature. The biuret-formaldehyde mixture is added to the urea mixture formed in a) above; the resulting mixture is blended quickly and then poured into a 9 oz. plastic cup mold. A very white, solid forms on standing which exhibits little shrinkage.

EXAMPLE 19

24gm. of urea and 22gm. of resorcinol are mixed with 14.4gm. of zirconium tetrachloride. 10ml. of water is added to the mixture. After the evolution of gas subsides, 7ml. of concentrated sulfuric acid are added dropwise to the solution at room temperature. The addition of sulfuric acid results in an exothermic reaction with the evolution of hydrogen chloride. After the addition of acid is complete, the solution is heated to 180° F, after which the temperature is allowed to return to room temperature. 72ml. of 37% formaldehyde is added to the urea complex and the resulting mixture is blended and poured into a mold. Polymerization occurs rapidly resulting in a pink polymer which exhibits little shrinkage and shows no decomposition after standing for 10 months. No decomposition or cracking is observed upon immersing the polymer in water for 48 hours.

EXAMPLE 20 a. A mixture of 15.0gm. of urea and 14.4gm. of zirconium tetrachloride is heated to 150° C. The resulting melt is removed from the heat and 25ml. of water is added. The mixture is then heated to boiling and 3% hydrogen peroxide is added dropwise to the boiling solution with stirring. One milliliter aliquots are removed at intervals and titrated with 1N aqueous hydroxide at a pH of 8. The addition of peroxide is continued until the titratable acid ratio is 1.0. 15gm. of urea is added and the mixture is heated at 40° C until the urea is dissolved.

b. A mixture of 112ml. of 37% formaldehyde solution, 25.2gm. of melamine and 18gm. of urea is heated to 60° C until solution occurs, and the solution is then cooled to room temperature. The cool solution is added to the solution prepared in a) above with stirring and the mixture is poured into a 5 oz. plastic cup. The mixture solidifies as a hard, glossy translucent material, which becomes transparent after standing at room temperature for several days.

EXAMPLE 21 a. Urea (.9 mol, 54 g.) and zirconium tetrachloride (.0625 mol., 14.56g.) are mixed together and the mixture is cooled to 0° C in an ice bath. Distilled water (30 ml.), cooled to 2° C, is added to the mixture and the resultant aqueous mixture is stirred until complete solution occurs. After all particulate matter is completely dissolved, magnesium oxide powder (.0625 mol., 2.5g.) is added slowly with stirring at room temperature and the stirring is continued until all of the solid is dissolved. The temperature of the mixture is maintained below 70° C during the addition of the magnesium oxide.

b. To 1.2 mol. (96ml.) of 37% formaldehyde is added 0.1 mol. (12.6g.) of melamine and the resultant mixture is heated to 70°–75° C until the melamine is completely dissolved and a clear solution is obtained. The resultant solution is cooled to room temperature and the formaldehydemelamine solution is added to the urea mixture prepared in a) above at room temperature. The resulting mixture is blended quickly and then poured into a mold. The solution reaches the gelation point in three minutes.

EXAMPLE 22 a. Urea (.9 mol., 54g.) is mixed with zirconium tetrachloride (0.0625 mol., 14.56g.) and 30ml. of distilled water are added to the mixture with stirring until all of the solid particles are dissolved. Magnesium oxide (2.0625 mol., 2.5g.) is placed in a separate beaker and to it is added 15ml. of distilled water with stirring until a slurry of magnesium hydroxide is formed. The slurry of magnesium hydroxide is then added to the urea zirconium tetrachloride solution at room temperature with stirring and the stirring is continued until a clear solution is obtained.

b. To 1.2 mol. (96ml.) of 37% formaldehyde is added 0.1 mol. (12.6g.) of melamine and the resultant mixture is heated at 70°–75° C until the melamine is completely dissolved and a clear solution is obtained. The solution is then cooled to room temperature and is added to the urea solution prepared in a) above at room temperature. The resultant mixture is blended quickly and then poured into a mold. The gelation time for the solution is three minutes.

EXAMPLE 23 a. Urea (0.9 mol., 54g.) is mixed with zirconium tetrachloride (0.0625 mol., 14.56g.) and to the resultant mixture is added 20ml. of distilled water with stirring; the mixture is stirred until a clear solution is obtained. In a separate beaker 3.5g. of calcium oxide (0.0625 mol.) is added to 10ml. of distilled water at room temperature and the resultant slurry is added to the urea zirconium tetrachloride solution. The mixture is stirred at room temperature until a clear solution is obtained.

b. To 1.2 mol. (96 ml.) of 37% formaldehyde is added 0.1 mol. (12.6g) of melamine and the mixture is heated at 70° C until a clear solution is obtained. The resultant solution is then cooled at room temperature and added to the urea solution formed in a) above. The resultant mixture is blended quickly and then poured into a mold.

EXAMPLE 24 a. Urea (2.9 mol., 54 g.) is mixed with titanium tetrachloride (0.0625, 11.83 g.) and 25 ml. of distilled water are added to the mixture with stirring until all of the solid particles are dissolved. Magnesium hydroxide (0.0625 mol., 3.65 g.) is placed in a separate beaker and to it is added 7 ml. of distilled water with stirring until a slurry is formed. The slurry of magnesium hydroxide is then added to the urea titanium tetrachloride solution at room temperature with stirring and the stirring is continued until a clear solution is obtained.

b. To 1.35 mol. (108 ml.) of 37% formaldehyde is added 0.1 mol. (12.6 g.) of melamine and the resultant mixture is heated at 70°–75° C. until the melamine is completely dissolved and a clear, colorless solution is obtained. The solution is then cooled to room temperature and is added to the urea solution prepared in a) above at room temperature. The resultant mixture is blended quickly and then poured into a mold.

EXAMPLE 25 a. Urea (0.9 mol., 54 g) is mixed with titanium terachloride (.0625 mol., 11.83 g.) and 25 ml. of distilled water are added to the mixture with stirring until all of the solid particles are dissolved. Magnesium hydroxide (0.0625 mol., 3.65 g.) is placed in a separate beaker and to it is added 7 ml. of distilled water with stirring until a slurry is formed. The slurry of magnesium hydroxide is then added to the urea titanium tetrachloride solution at room temperature with stirring and the stirring is continued until a clear solution is obtained.

b. To 1.35 mol. (108 ml.) of 37% formaldehyde is added 0.1 mol. (12.6 g.) of melamine and the resultant mixture is heated at 70°–75° C. until the melamine is completely dissolved and a clear solution is obtained. To the resulting solution is added 12.4 g. of polyethylene glycol (average m.w. 3,000–3,700) at 70° C. with stirring. The solution is then cooled to room temperature and is added to the urea solution prepared in a) above at room temperature. The resultant mixture is blended quickly and then poured into a mold.

EXAMPLE 26 a. Urea (.9 mol., 54 g.) is mixed with titanium tetrachloride (0.0625 mol., 11.83 g.) and 25 ml. of distilled water are added to the mixture with stirring until all of the solid particles are dissolved. Sodium bicarbonate (0.0625 mol., 10.5 g.) is placed in a separate beaker and to it is added 7 ml. of distilled water with stirring until a slurry is formed. The slurry of sodium bicarbonate is then added to the urea titanium tetrachloride solution at room temperature with stirring and the stirring is continued until a clear solution is obtained.

b. To 1.35 mol. (108 ml.) of 37% formaldehyde is added 0.1 mol. (12.6 g.) of melamine and the resultant mixture is heated at 70°–75° C. until the melamine is completely dissolved and a clear, colorless solution is obtained. The solution is then added to 14.6 g. of 2,2,4-trimethylpentanediol at 70° C. The solution is then cooled to room temperature and is added to the urea solution prepared in a) above at room temperature. The resultant mixture is blended quickly and then poured into a mold.

As will be understood by those skilled in the art, many variations and modifications can be made in the specifically enumerated examples without departing from the scope of the invention.

What is claimed is:

1. An aqueous urea-metal complex composition comprising:
   a. a urea-metal complex consisting a metal selected from the group consisting of zirconium, hafnium or titanium is a mole ratio of 0.01 to 0.5 moles of metal to one mole of urea; and
   b. water, in a ratio of 0.3 to 10.0 moles of water per mole of urea; said composition having an acid value of less than one.

2. An aqueous composition of claim 1 having an acid value of between 0.5 and 0.75.

* * * * *

UNITED STATES PATENT AND TRADEMARK OFFICE
CERTIFICATE OF CORRECTION

PATENT NO. : 4,067,893
DATED : January 10, 1978
INVENTOR(S) : Harry L. Lander

It is certified that error appears in the above-identified patent and that said Letters Patent are hereby corrected as shown below:

| | | |
|---|---|---|
| 5 | 33 | "insoluble, insoluble" should read --insoluble,-- |
| 6 | 63 | "ures" should read --urea-- |
| 7 | 44 | "an" should read --any-- |
| 10 | 22 | "a" should read --at-- |
| 11 | 30 | the word --or-- should be inserted between formulas |
| 14 | 19 | "1.4 gm" should read --11.4 gm-- |
| 15 | 5 | "unitl" should read --until-- |
| 16 | 61 | "to hard solid" should read --to a hard solid-- |
| 17 | 12 | "to pH" should read --to a pH-- |
| 17 | 51 | "aqueous hy-" should read --aqueous sodium hy- -- |

UNITED STATES PATENT AND TRADEMARK OFFICE
CERTIFICATE OF CORRECTION

PATENT NO. : 4,067,893
DATED : January 10, 1978
INVENTOR(S) : Harry L. Lander

It is certified that error appears in the above-identified patent and that said Letters Patent are hereby corrected as shown below:

| Col. | Line | | |
|------|------|---|---|
| 18 | 25 | "(2.0625" should read | --(.0625-- |
| 18 | 61 | "2.9 mol" should read | --(.9 mol-- |
| 20 | 28 (Claim 1a) | "is" should read | --in-- |

Signed and Sealed this

Fourth Day of July 1978

[SEAL]

Attest:

RUTH C. MASON
*Attesting Officer*

DONALD W. BANNER
*Commissioner of Patents and Trademarks*